Dec. 30, 1969  D. T. BUCK ET AL  3,487,356
PLURAL TERMINAL AND SLIP-ON CONNECTORS
Original Filed Sept. 14, 1966  3 Sheets-Sheet 1
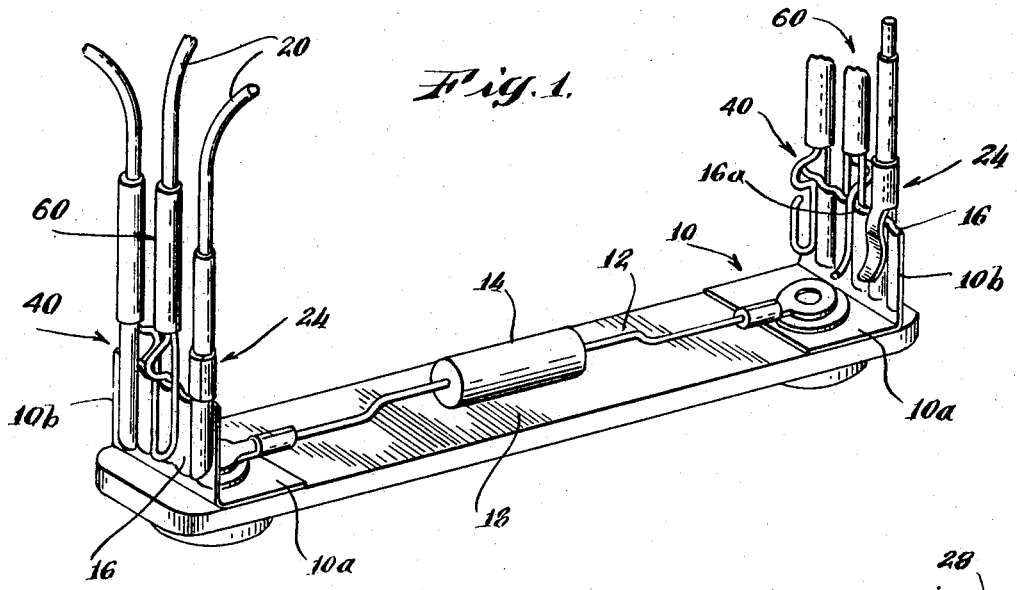
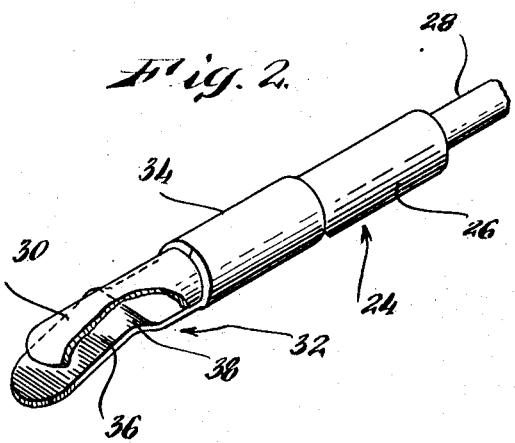
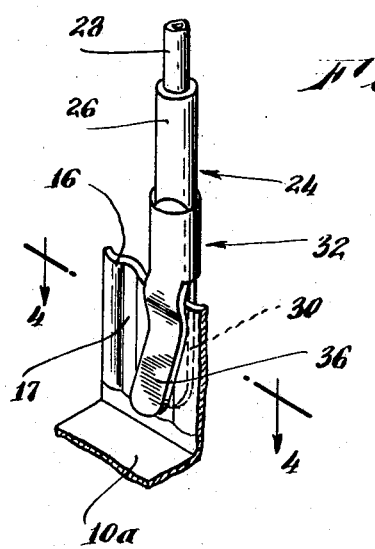
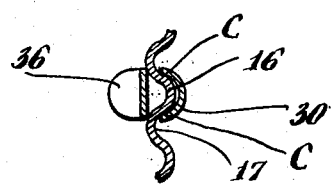
INVENTORS.
David T. Buck
David Berdan
Herbert Poplar

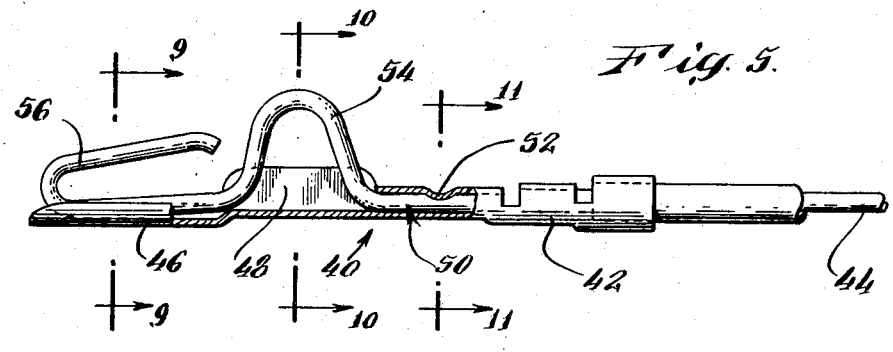
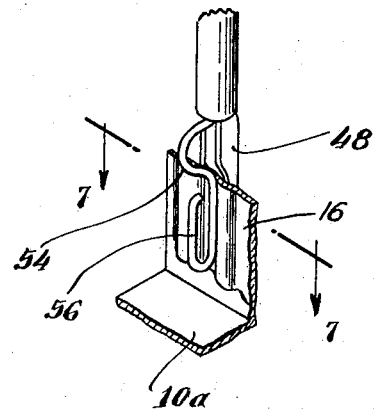
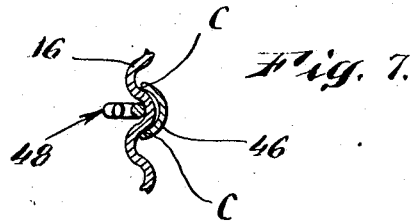
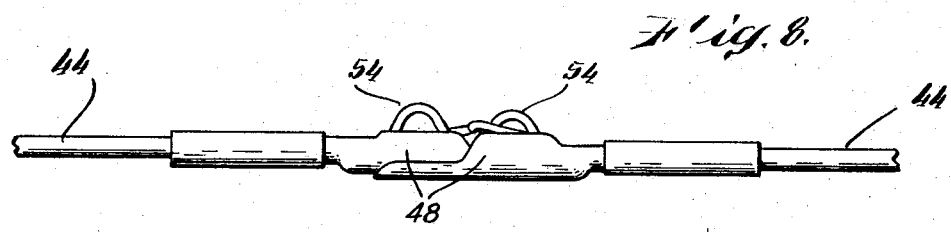
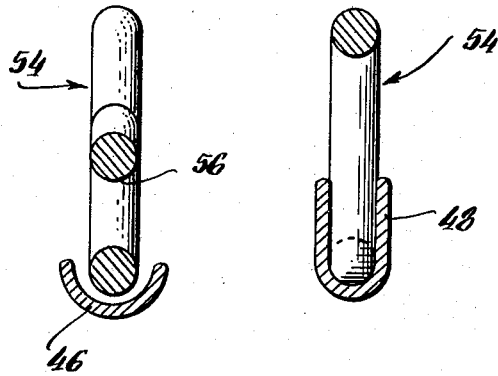
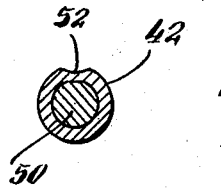

Dec. 30, 1969     D. T. BUCK ETAL     3,487,356
PLURAL TERMINAL AND SLIP-ON CONNECTORS
Original Filed Sept. 14, 1966     3 Sheets-Sheet 3
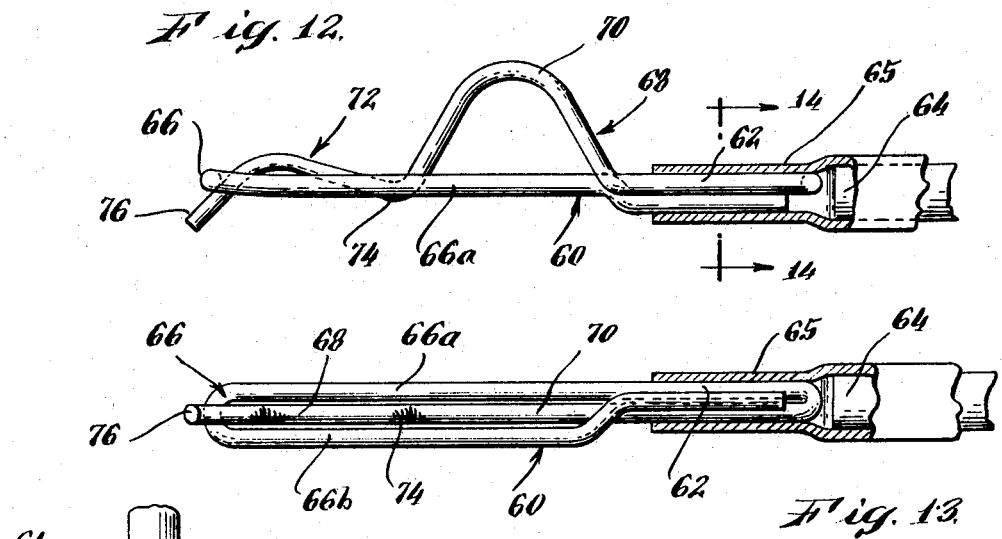
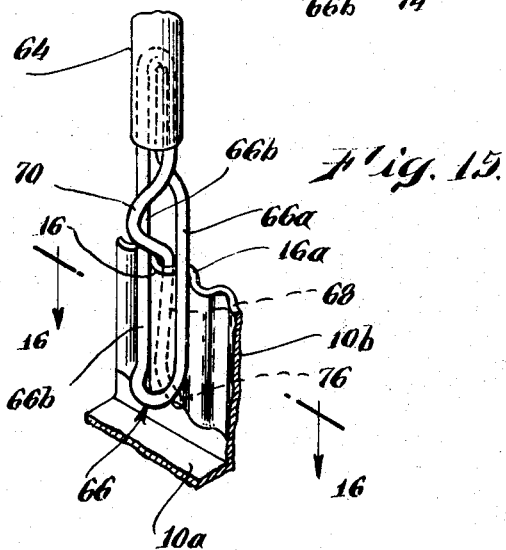
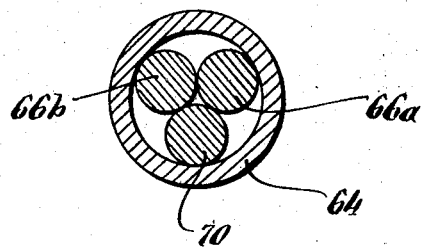
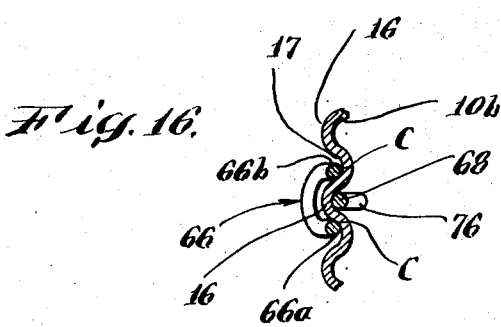
INVENTORS.
David T. Buck
David Berdan
Herbert Poplar United States Patent Office 3,487,356
Patented Dec. 30, 1969

3,487,356
PLURAL TERMINAL AND SLIP-ON CONNECTORS
David T. Buck, Freehold, David Berdan, Freehold Township, Monmouth County, and Herbert Poplar, Neptune, N.J., assignors to Buck Engineering Co., Inc., Farmingdale, N.J., a corporation of New Jersey
Continuation of application Ser. No. 579,252, Sept. 14, 1966. This application Oct. 22, 1968, Ser. No. 772,465
Int. Cl. H01r 13/24
U.S. Cl. 339—242
11 Claims

ABSTRACT OF THE DISCLOSURE

A connector is provided which is adapted to be slipped axially onto a terminal member comprising a plurality of convex areas opposed on its opposite face by concave areas, the connector comprising, a tubular portion adapted to receive the end of a conductor, and two contact arms extending from the tubular portion to engage any one of a plurality of matching contact areas of a terminal member, one of said arms being substantially half round and adapted to be superimposed over a transversely curved convex contact area of the terminal member, and the other contact arm being a spring arm extending in parallel relation to the longitudinal mid-line of the half round contact arm and shaped so that the connector may be readily slipped onto the terminal member with the spring arm pressing against a concave portion of the terminal member directly opposite the convexly curved portion of the terminal member which is engaged by the half round contact arm. The spring arm may be bent to provide one or more sockets to receive cross wires or pins, one of the sockets being formed by bending the spring arm outwardly intermediate its ends, and by extending the U-shaped contact arm laterally intermediate its ends and bending the lateral extensions toward one another to provide support for the legs of the U-shaped bend, the laterally extending portions of the half round contact arm coacting with the legs of the U-shaped bend in the first contact arm to form a substantially closed socket.

---

This application is a continuation of application Ser. No. 579,252, filed Sept. 14, 1966, and now abandoned.

This invention relates to an electric terminal member adapted to receive a plurality of slip-on connectors, the terminal member and the connectors having portions which interfit so that as the connectors are slipped on the terminal member they assume, and thereafter maintain, parallel positions equally spaced apart along the terminal member and contact the terminal member positively over an extensive area comprising at least a plurality of lines of contact.

A particular field of application contemplated for the invention is in connection with teaching equipment of the learning-by-doing type such, for example as is commercially available under the trademark "Lab-Volt." Devices of the kind disclosed herein may be included among the components such as resistors, capacitors, transformers, coils and motors which are supplied to educational laboratories along with student "experience" manuals.

In connection with the manufacture, and particularly the testing, of electric and electronic devices, it is often necessary to temporarily connect a number of wire ends, or leads, to one another or to one or more of a great variety of devices including testing devices.

It is desirable, and in many instances absolutely necessary as a practical matter, to be able to establish positive dependable connections, and to make and break connections rapidly. Heretofore it has been attempted to employ flat thin terminal members, struck out from sheet metal to receive a plurality of clip connectors. The connectors have comprised a pair of spring actuated jaws which serrated teeth. The operator opens the clip by spreading the jaws apart and closing them on opposite surfaces of the terminal member. The contact thus provided depends on the number and size of teeth on each jaw which are in contact with the terminal member. Such connectors tend to slip on the terminal member. Even if the contact is sufficient, the connectors tend to assume different angles relative to the terminal member and this is undesirable since there are usually many leads and they tend to become snarled.

Accordingly, it is an object of the invention to provide a terminal member/connector combination such that a plurality, desirably several, of the connectors, can be easily and quickly slipped onto the terminal member and provide a positive, satisfactory contact between each connector and the common terminal member, with the connectors coacting with the terminal member to assume parallel positions evenly spaced apart longitudinally, along the terminal member.

Another object of the invention is to provide a terminal member and slip-on connector combination which will provide a tight pressure fit between one or more connectors and a terminal member, no matter how complex the wiring arrangement or how many connectors are attached or removed.

Another object of the invention is to provide a combination of terminal members and slip-on connectors such that no tools are required and no soldering is needed to consistently obtain a firm, positive contact of low electrical resistance.

Another object of this invention is to provide terminal member slip-on connector combinations which are adapted to limited cross connection usage, and to easy connection with conventional "alligator clips."

Another object of the invention is to provide an improved combination of the kind mentioned above, comprising a terminal member having a contoured surface defining a plurality of receptor portions which serve both as homing means and contact surfaces, and one or more slip-on connectors each comprising a first member shaped to accommodate itself to a receptor portion of the terminal member and to provide a large area which is held in contact with said receptor portion by a second member.

Another object of the invention is to provide an improved plural terminal member slip-on connector combination which increases the coupling potential of such combinations and which is compact, convenient, practical and inexpensive.

The invention will best be understood by reading the following description in connection with the drawings, in which, FIGURE 1 is an isometric view showing two opposed terminal members, mounted on a base and interconnected with three pairs of contact members, the members of each pair being oppositely disposed to better show their engagement with the terminal members.

FIGURE 2 is an isometric view of a first modification of slip-on connector.

FIGURE 3 is an isometric view on an enlarged scale showing a first modification of slip-on connector positioned on a terminal member.

FIGURE 4 is a cross section taken on the line 4—4 of FIGURE 3 showing the wide area of contact between the slip-on connector and the terminal member.

FIGURE 5 is a side elevation, partly in section of a second modification of slip-on connector. (Note retaining sides.)

FIGURE 6 is a view similar to FIGURE 2 but showing the second modification of slip-on connector in combination with a terminal member.

FIGURE 7 is similar to FIGURE 4 showing the wide area of contact between the second modification of the connector and the terminal member.

FIGURE 8 is a side elevation showing how two slip-on connectors of the kind shown in FIGURES 5–8 may be themselves interconnected.

FIGURE 9 is a cross sectional view taken on the line 9—9 of FIGURE 5.

FIGURE 10 is a cross section taken on the line 10—10 of FIGURE 5.

FIGURE 11 is a cross section taken on the line 11—11 of FIGURE 5.

FIGURE 12 is a side elevation, partly in section, of a third modification of the slip-on connector.

FIGURE 13 is a view similar to FIGURE 12 but rotated through 90 degrees.

FIGURE 14 is a cross section taken on the line 14—14 of FIGURE 12.

FIGURE 15 is a view similar to FIGURES 3 and 6 but showing the third modification of slip-on connector in combination with the terminal member, and FIGURE 16 is a cross section taken on the line 16—16 of FIGURE 15, showing the three lines of contact between the slip-on connector and the terminal member.

Where it is employed herein, the term "half-round" is used broadly, to describe portions of the connector members which are trough shaped, and more or less semicircular in cross section.

In the drawings, in FIGURE 1 a pair of terminal members 10 are shown spaced apart and interconnected by the lead 12 which includes a resistor 14 intermediate its ends. Three modifications of a slip-on connector are shown in FIGURES 2–4, 5–11 and 12–16, all of the modifications being self aligning with a receptor portion 16 of a terminal member 10, and adapted to provide an area of contact with the receptor portion which comprises at least two lines of contact, C and C, along the respective lateral edges of the receptor portion.

As illustrated herein in FIGURES 1, 3, 6 and 15, the terminal members 10 are angle members, each comprising one flange 10a, disposed flat on a base 18, and another flange 10b, which is normal to flange 10a and extends outwardly from base 18. The flanges 10a of a pair of spaced members 10 are interconnected by lead 12 and resistor 14.

The flanges 10b are adapted to receive slip-on connectors provided at one end or both ends of leads 20, the other ends of which may be connected in any suitable way to a great variety of different electrical or electronic components. At least one face of each terminal member flange 10b defines a plurality of, preferably several, receptor portions 16, in the form of convex ribs, extending outwardly in relation to the flanges 10a respectively, in parallel, and spaced apart laterally. As shown herein, FIGURES 1, 3, 6 and 15, each of the opposed terminal flanges 10b are formed with a series of receptor portions 16 in the form of convex ribs, projecting from one face, and another series of receptor portions 16a in the form of convex ribs, projecting from its other face, the ribs 16 extending from one face being slightly offset with respect to the ribs 16a extending from the other face. This construction, of two sets of receptor portions 16 and 16a extending from opposite faces of a terminal member flange 10b, with one set somewhat offset laterally with respect to the other set, may be provided by crimping a flat, thin piece of sheet metal. It has the advantage over a flange having receptor portions projecting from only one face that it will receive slip-on connectors irrespective of which way the connectors are presented to its outer edge.

While the three modifications of slip-on connectors shown herein are functionally substantially the same they differ somewhat in construction.

The first modification, comprises members 24 and 32 which are joined together adjacent their inner ends. First member 24 comprises a tubular portion 26 at one end to receive the end of a conductor 28, and a concave, trough shaped portion 30, which is preferably curved transversely with the same radius as the receptor portions 16 of the terminal members 10. The second member 32 of the first modification comprises an inner portion 34, extended laterally to provide flange portions which may be wrapped around the inner end of member 24, and an outer portion 36 defining a spring arm which extends over the open face of the portion 30, of member 24, in spaced, substantially parallel relation to portion 30. The spring arm portion 36 of member 32 is bent intermediate its ends providing a portion 38 extending inwardly toward the concave open face of member 24, and adapted to contact and yieldingly engage the surface of flange 10b of a terminal member 10 opposite to the surface having the receptor portion 16 which is covered by the concave surface of portion 30 of the first member 24. Since the portion 30 of each first member 24 will align itself with, and slip over, a homing, receptor portion 16 of the terminal member 10b the spring arm portion 36 will press on the surface of a terminal member opposite a convex receptor portion 16. The terminal members shown in FIGURES 1, 3, 6 and 15 have been crimped or otherwise provided with a series of convex ribs 16 spaced apart by trough-like concavities 17.

As shown in FIGURE 4 the spring arm 36 will partly bridge and partly extend into a trough-like concavity 17 of the terminal member and thus press on it along two lines. The extent of entry of a spring arm 36 into a concavity 17 will depend on its width. To the extent that it enters into a concavity it will aid in bringing a first member 24 into register with a convex rib receptor portion, 16, of a terminal member. The outer extremity of spring arm 36 of member 32 is bent away from the free end of member 24 to facilitate slipping the connector over a terminal flange 10b.

The second modification of connector comprises first and second members 40 and 50 respectively. The first member 40, comprises an inner end 42 which is adapted to receive the end of a lead wire 44, and an outer end 46, which is "half-round" providing a surface adapted to be superimposed over a convex rib 16 in the terminal member. The intermediate portion of member 40 is extended laterally and given a U-shape at 48, FIGURE 5, providing lateral support to the second member 50. The second member 50 is a spring wire the inner end of which is secured at 52 to the inner end of the first member 40, the intermediate portion of which is shaped providing horse shoe shaped socket or seat 54, adapted to receive a cross wire or pin and the outer end of which is bent back upon itself forming a hook shaped socket 56 adapted for insertion in standard binding post ad jacks. The hook shaped end 56 of member 50 is inclined in a direction to engage and press against a surface of a terminal member 10b inserted between the free ends of members 46 and 56.

The third modification consists of a unitary spring wire 60, which at one end, 62, extends into the metal tube or ferrule 65 which also receives an end of a lead 64, the wire 60 being bent forming a long narrow loop 66 comprising substantially parallel sides 66a and 66b, and a length 68, most of which, except for its free tip, is disposed within, and extending longitudinally of, loop 66. An intermediate portion of length 68 is bent into a hore shoe shaped socket 70 which is adapted to receive a cross wire or pin, and the free end portion 72 is bent with an S bend providing a portion 74, inclined slightly in one direction relative to the plane of loop 66, and an extreme end portion 76, which extends beyond the loop and is inclined slightly away from it, providing spacing between the outer extremities of the loop 66 and the portion 76 to facilitate slipping the connector over the free, outer edge of a terminal member flange 10b.

It will be seen that the loop 66 of the third modification of connector functions like the "half-round" portions 30 and 46 of the first and second connector modifications, to fit around the convex rib shaped receptor portions 16 of terminal members 10b, and make contact with a receptor portion along the lateral edges of the receptor portion. The two lines of contact thus provided on opposite sides of a convex rib of the terminal member coact with the rib to hold the connector in position on the terminal member and prevent it from slipping along the terminal, or from becoming tipped and askew on the terminal.

The "half-round" cross-section structure of portions 30 and 46 of the first members of the first and second connector modifications, respectively provide the above mentioned minimum of two lines of contact with the terminal member and in addition may provide an area of contact equally or substantially equal to the area of the half-round portions of said modifications which in use are superimposed over the convex, receptor portions of the terminal member.

The combination described herein has the great advantage for component coupling that the desired connections are easy and quick to make, for students as well as experienced workmen. The connections are positive and provide contact over a substantial area, thus keeping electrical resistance at a minimum, although quick to make and "un-make." Any desired number of connections may be made to a single terminal and each connection will be equally spaced from the others, without effort on the part of the operator, due to the homing tendency of the parts.

There has thus been provided a terminal member slip-on connector combination in which the above mentioned objects have been accomplished in a thoroughly practical way.

We claim:
1. A slip-on connector in combination with a terminal member, said connector comprising a portion adapted to receive an end of a conductor, a first contact arm having a portion which is curved transversely and is substantially half round and adapted to be superimposed over a transversely curved convex contact area of said terminal member, and a second contact arm which is a spring arm extending in close substantially parallel relation to the first contact arm along a longitudinal mid-line of an opposed face of the first contact arm, an extremity of the second contact arm being inclined toward the opposed face of the first contact arm and then bent away from the first contact arm to facilitate slipping the connector over the said terminal member with an end of the second contact arm pressing against a face of the terminal member directly opposite to the convexly curved face of the terminal member which is contacted by said first contact arm, said terminal member being a corrugated strip adapted to receive simultaneously a plurality of said slip-on connectors and defining on each face a plurality of convex areas separated by concave areas.

2. The connector assembly claimed in claim 1 in which said end of the second contact arm is bent back into a substantially closed loop forming a socket.

3. The connector assembly claimed in claim 1 in which the spring arm is bent intermediate its ends to define an outwardly extending wire and pin receiving socket, and is also bent back adjacent its free end to define a second wire and pin receiving socket.

4. The connector assembly claimed in claim 1 in which a convex area on one face of the terminal member is opposed by a concave area on the other face of the terminal member, said spring arm extends into said concave area and is restrained from lateral displacement by the side walls of the concave area.

5. The connector assembly claimed in claim 1 comprising, an insulating base member, a plurality of corrugated terminal members mounted on said base and interconnected by a conductor having an electrical component intermediate its ends, each face of each terminal member comprising a plurality of spaced convex rib-like areas disposed opposite concave areas defined by the opposite face.

6. The connector assembly claimed in claim 1 in which the second contact arm is bent intermediate its ends first outwardly then inwardly forming a wire and pin receiving socket which is open at its inner end and closed at its outer end.

7. The connector assembly claimed in claim 6 in which the intermediate portion of the first contact arm is extended laterally and given a U-shape, the outwardly projecting legs of the U-shape portion extending on opposite side of the legs of the socket which is intermediate the ends of the second contact arm thus providing lateral support for the legs of the socket which is intermediate the ends of the second contact arm, and also coacting with the intermediate portion of the second contact arm to define a substantially closed socket.

8. A slip-on connector comprising a portion adapted to receive the end of a conductor, a first contact arm having a longitudinally straight portion which is curved transversely and is substantially half round and adapted to be superimposed over a transversely curved convex contact area of a terminal member, and a second contact arm which is a spring arm extending in close substantially parallel relation to the first contact arm along the longitudinal mid-line of the opposed face of the first contact arm, said second contact arm including a first portion inclined toward the opposed face of the first contact arm and then bent away from the first contact arm to form a second inclined portion along the first inclined portion with said first inclined portion of the second contact arm pressing against a concave face portion of the terminal member directly opposite to the convexly curved face of the terminal member which is contacted by said first contact arm.

9. The slip-on connector claimed in claim 8 in which said second inclined portion of the second contact arm is further bent toward said first contact arm to form a substantially closed loop forming a socket.

10. The connector assembly claimed in claim 8 in which the second contact arm is bent intermediate its ends first outwardly then inwardly forming a wire and pin receiving socket which is open at its inner end and closed at its outer end.

11. The connector assembly claimed in claim 10 in which the intermediate portion of the first contact arm is extended laterally and given a U-shape, the outwardly projecting legs of the U-shape portion extending on opposite sides of the legs of the socket which is intermediate the ends of the second contact arm thus providing lateral support for the legs of the socket which is intermediate the ends of the second contact arm, and also coacting with the intermediate portion of the second contact arm to define a substantially closed socket.

References Cited

UNITED STATES PATENTS

| 1,769,325 | 7/1930 | Warner | 339—258 |
|---|---|---|---|
| 2,062,690 | 12/1936 | Weynard. | |
| 2,414,630 | 1/1947 | Borza. | |
| 3,223,957 | 12/1965 | Cannon | 339—18 |

FOREIGN PATENTS

| 1,257,083 | 2/1961 | France. |
|---|---|---|
| 1,374,648 | 8/1964 | France. |

RICHARD E. MOORE, Primary Examiner

J. H. McGLYNN, Assistant Examiner

U.S. Cl. X.R.

339—256